Dec. 7, 1965 TATSUO FUJII 3,221,630
CAMERA DIAPHRAGMS WITH SQUARE OPENINGS
Filed Dec. 23, 1964 3 Sheets-Sheet 2

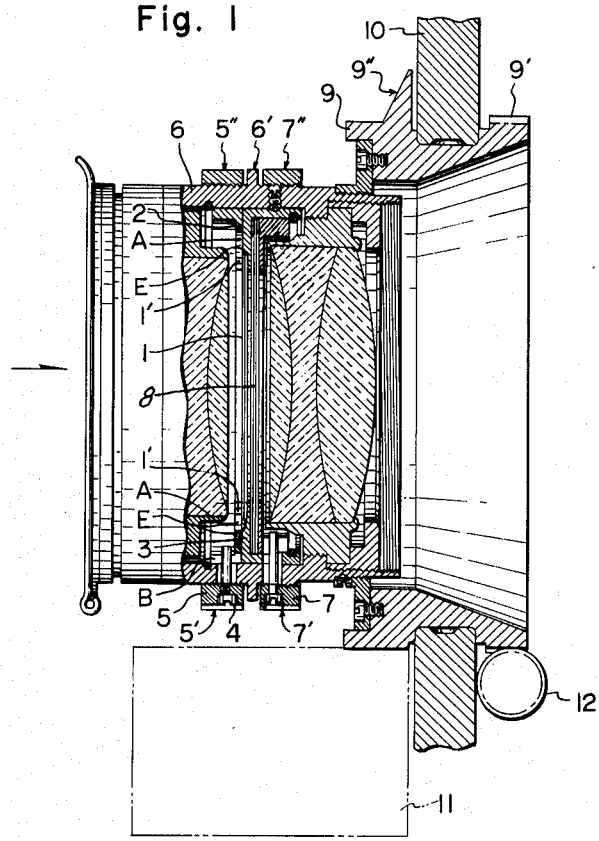

INVENTOR.
TATSUO FUJII
BY
ATTORNEY

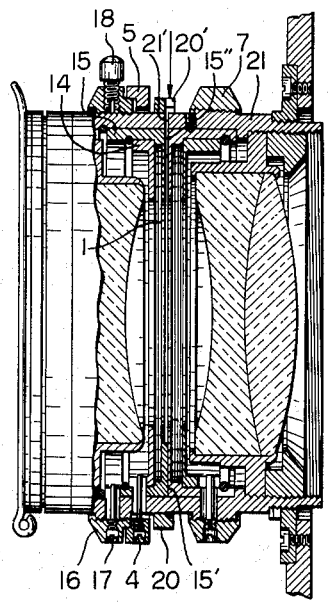
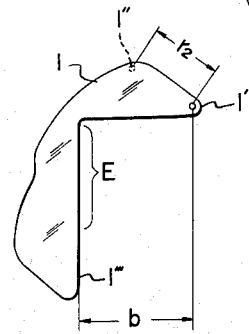
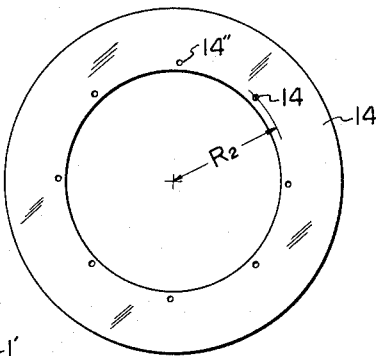
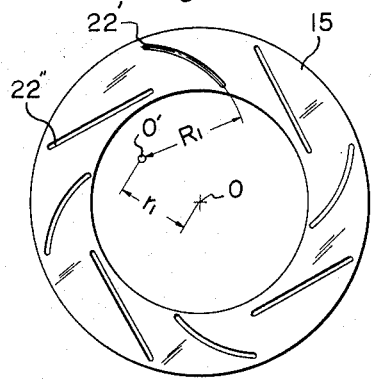
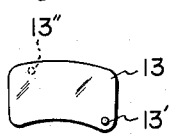
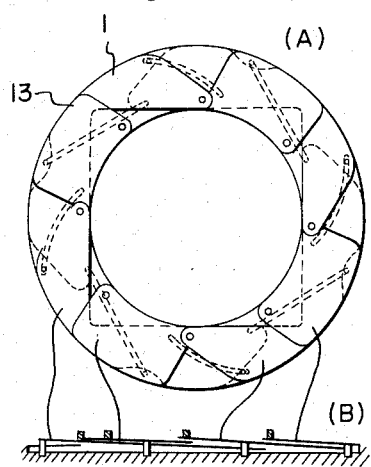
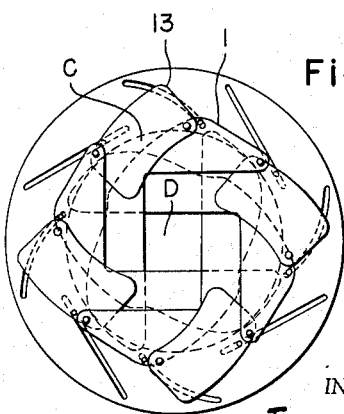

United States Patent Office 3,221,630
Patented Dec. 7, 1965

3,221,630
CAMERA DIAPHRAGMS WITH SQUARE
OPENINGS
Tatsuo Fujii, 179 Honmura-cho, Azabu, Minato-ku,
Tokyo, Japan
Filed Dec. 23, 1964, Ser. No. 423,897
Claims priority, application Japan, July 25, 1961,
36/26,298
4 Claims. (Cl. 95—64)

The instant application is a continuation-in-part of application, Serial Number 193,169, filed May 8, 1962, now abandoned.

The present invention relates to diaphragms, more particularly to diaphragms with square openings, for photographic copying, enlarging, photomechanical reproducing, and other, cameras.

Besides iris diaphragms with circular openings, diaphragms with square openings and also openings of other configurations in the form of insert lenses, are used for photographic copying, enlarging, photomechanical reproducing and other, cameras. However, because of the general requirement that cameras be capable of operation by remote control, it has become necessary for them to have their diaphragms, especially the square opening diaphragms frequently used therein, constructed and installed in the form of insert diaphragms built into the lens system just like iris diaphragms. Therefore cameras are provided with built-in diaphragms having square, or more generally polygonal, openings capable of independent and continuous change in the orientation of, as well as the length of, their effective sides defining the opening without removal from the camera.

In accordance with the present invention, it is feasible to provide equally and broadly graduated diaphragm scales, of practical allowable accuracy in relatively small diametered lens mounts without special elements; a feature of this invention advantageous with respect to manufacture, use and accuracy. The unnecessary space left open and uncovered by the diaphragm leaves resulting from the selected use of the smallest possible, but nevertheless adequate, sized leaves to define the contour of such square, or other polygonal, opening, thereby to minimize any potential increase in the lens mount incorporating a diaphragm of such opening, may well and readily be covered by simultaneously using an iris diaphragm, interlocked electrically or mechanically with the leaves of the square opening diaphragm, or by using a number of overlapping auxiliary leaves provided in the square opening diaphragm and operatively interlocked with the main leaves thereof.

Therefore, a principal object of the invention, in addition to satisfying the above mentioned conditions, is to provide lens systems with built-in square diaphragms, i.e. diaphragms with square openings, capable of free, independent and continuous change in the orientation, as well as in the length, of the effective sides of their aperture openings while taking into account the factor of minimizing a possible increase in the diameter of the lens mount incorporating such diaphragms forming a square opening.

The above object, along with other objects and features of instant invention will appear more clearly and fully from the following description taken in conjunction with the drawing of two illustrative and preferred embodiments, in which drawing a first illustrative embodiment is shown in FIGURES 1 through 5, whereof:

FIGURE 1 is a longitudinal section through a camera objective incorporating a square diaphragm and an iris diaphragm of my invention;

FIGURE 2 is a front view of the driving ring for the square diaphragm of the first illustrative embodiment;

FIGURE 3 is a front view illustrative of the two leaves of the square diaphragm as they form a square opening;

FIGURE 4 is a front view of a single leaf of the square diaphragm;

FIGURE 5 is a diagrammatic view of a servomechanism for the driving mechanisms and control circuits used in the first embodiment; while FIGURES 6 through 14 are illustrative of the second preferred embodiment, of which FIGURE 6 is a longitudinal section through a camera objective incorporating such second embodiment;

FIGURE 7 is a front view of such insert diaphragm;

FIGURE 8 is a plan view showing the back of the slot ring;

FIGURE 9 is a front view of a single leaf of the square diaphragm of such second embodiment;

FIGURE 10 is a front view of a single leaf of the auxiliary leaves for the square diaphragm of this embodiment;

FIGURE 11 is an illustrative view of the configuration of the dowel holes in the driving disk;

FIGURE 12 is an illustrative view of the configuration of the slots for the dowel pins;

FIGURE 13A is a front view illustrative of the leaves of the square diaphragm as they form the opening of largest area;

FIGURE 13B is a lateral view of the leaves of the square diaphragm as they are overlapped in forming the opening of the largest area as shown in FIGURE 13A; and FIGURE 14 is a front view of the leaves of such embodiment as they form an opening of small area.

Figure 5:
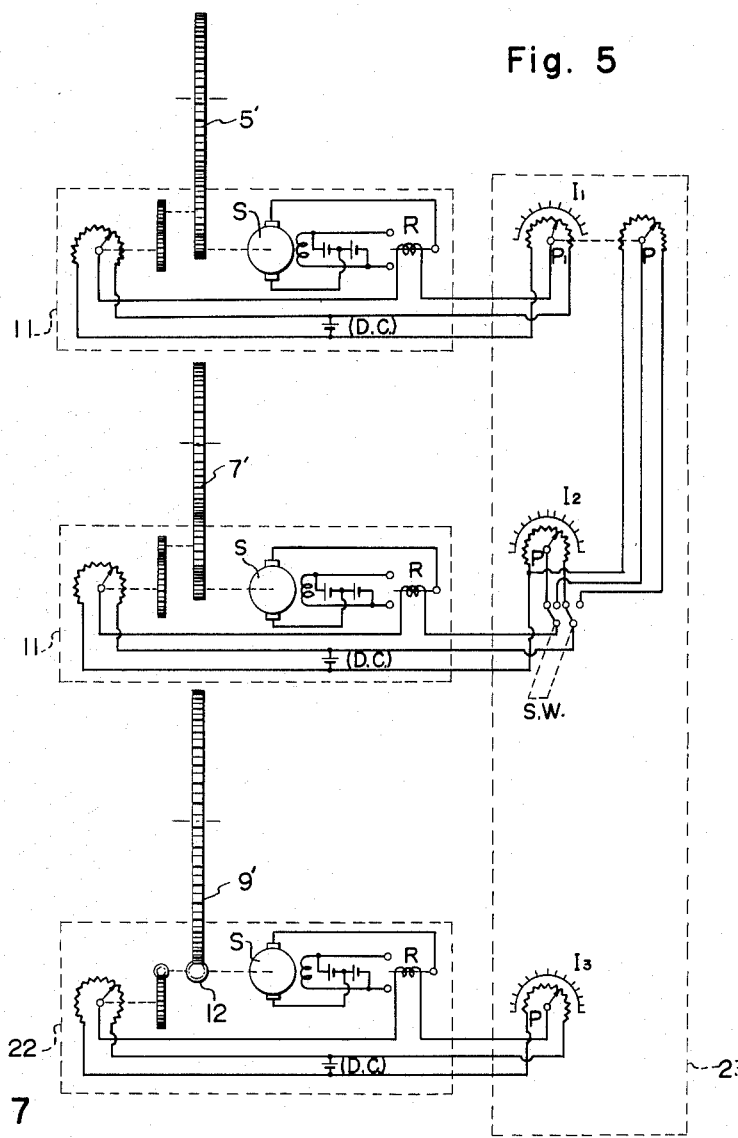
Figure 7:
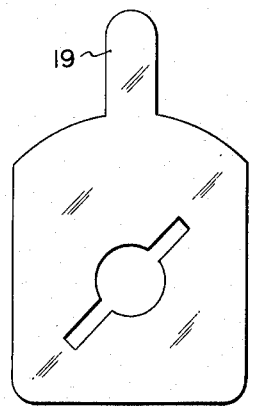
Figure 8:
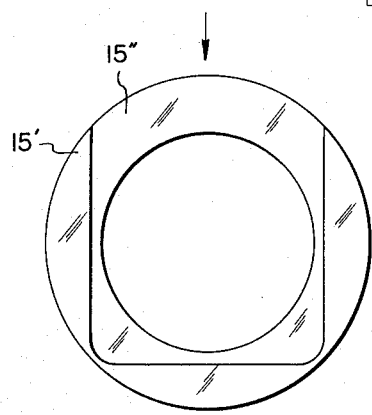

Referring to the first embodiment of my invention as shown in FIGURES 1 through 5, to change only the orientation of the sides of the opening but not the area of opening D of the square opening, lens mount 6 and external sleeve 9, rigidly fitted thereto, are freely rotatable to a certain extent through worm gear 12 and pinion gear 9′ integral with external sleeve 9 by a driving mechanism rigidly fitted to bearing 10 and operating under the instructions of a control circuit; the driving mechanism 22 and control circuit 23 being shown in FIGURE 5. Changes in the orientation of the sides of square opening D are thus produced.

To change only the area of opening D but not the orientation of its sides, square diaphragm ring 5 is revolved through a toothed section 5′ thereof by a driving mechanism contained in housing 11, rigidly fitted to external sleeve 9 and operating under the instructions of the control circuit, which driving mechanism 11 with control circuit 23 is, as stated, shown in FIGURE 5. The rotation of square diaphragm ring 5 is transmitted to square diaphragm driving ring 2 through screw 4 slidably fitted into groove B of driving ring 2 slidably in lens mount 6. The rotation of driving ring 2 is transmitted to leaves 1 of the square diaphragm through dowel pins 1′ in diaphragm leaves 1 positioned in cam slots A in driving ring 2 for the square diaphragm. The two leaves 1 of the square diaphragm, guided by linear guides E on the side opposite to the guide for slot ring 3 of the iris diaphragm, move linearly in opposite directions changing only the area of the square opening but not the orientation of the sides thereof.

The possible unnecessary free spaces C left uncovered by square diaphragm leaves 1, are completely covered by iris diaphragm leaves 8 operatively interlocked with the movement of square diaphragm leaves 1 through a toothed section 7′ on iris diaphragm ring 7 by the driving mechanism and control circuit for the iris diaphragm contained, as stated in FIGURE 5, in housings 11 and 23. Independent operation of the iris diaphragm can, however, take place without operative interlock to the square diaphragm, leaves 1 of which in such case are so positioned as to have nothing to do with the iris diaphragm when opening leaves 8 of the iris diaphragm. The servomechanism shown diagrammatically in FIGURE 5 is a conventional mechanism in which elements 9', 5' and 7' are the gears above mentioned to be rotated by driving instructions contained in housings 11 and 22 under the instructions of the control circuits contained in housing 23. In FIGURE 5, potentiometers, direct current servomotors and relays are designated by references P, S and R, respectively; elements $I_1$, $I_2$ and $I_3$ being, respectively, the scale for showing the area of the square diaphragm openings, the magnitude of the iris diaphragm openings, and the orientation angles of the sides of the square opening in angular degrees; with switch S.W. being provided for switching the operation of the square diaphragm to that of the iris diaphragm and vice versa. To operate the iris diaphragm independently of the square diaphragm, iris diaphragm potentiometer $P_2$ is moved in connection with its scale $I_2$ after throwing switch S.W. when potentiometer $P_1$ for the square opening diaphragm has been moved to the position at which the square opening diaphragm is fully opened.

Both square diaphragm ring 5 and iris diaphragm ring 7 have knurled portions 5' and 6' while other portions of each, 5" and 7", carry printed diaphragm opening scales, and flange 6' of lens mount 6 has markings for both scales. Orientation angle graduations are provided on the periphery of front-facing annular bevel 9" integral with rotatable sleeve 9, and bearing 10 has markings so that the angular displacement of the square diaphragm opening can easily be read from the front of the camera.

Referring now to the second illustrative preferred embodiment of my invention shown in FIGURES 6 through 14, changes in the orientation of the sides but not in the area, of opening D of the square diaphragm are made as follows: reference 14 designates the dowel ring for the square opening diaphragm, square diaphragm ring 5 is connected through pin 4 to dowel ring 14 for rotation therewith, and element 15 is the slot ring for square diaphragm leaves 1. Where pin 4 passes through slot ring 15, the latter is provided with a radially elongated aperture. Square opening diaphragm orientation ring 16 is connected through pin 17 to slot ring 15 for rotation therewith and has a clamping pin rigidly fitting it to the lens mount body. Dowel carrying ring 14 is fitted to slot ring 15 and square diaphragm ring 5 but to square diaphragm orientation ring 16 rotatable only to a predetermined limited extent of angular displacement. Revolving orientation ring 16 after the latter is released from clamping pin 18, permits the simultaneous rotation of slot ring 15 through pin 17 and of dowel ring 14 as the result of the friction between the latter and slot ring 15 without changing their relative position, so that the square diaphragm changes the orientation of its sides but not the area of its opening, which may be set at any desired angle by again clamping pin 18. The use of insert diaphragm 19 (FIGURE 7) does not hinder changing the orientation of the sides of the square diaphragm opening and this takes place in a similar way: insert diaphragm 19 is inserted in the directions shown by the arrow in FIGURES 6 and 8 and demountably fitted in linear guide groove 15" in the rear face 15' of slot ring 15 without imparting any rotation to ring 15. Therefore, rotation of orientation ring 16 of the square opening diaphragm produces as much change in the orientation of the sides of the opening as ring 16 is rotated. Dust guard ring 20 may be rotated to a predetermined definite angular extent. Notch 20' extends over a portion of the guard ring and is so positioned as to permit performance of either of two alternatives, namely, firstly, that notch 20' completely overlaps and registers with opening 21 for mounting and demounting such diaphragms, and secondly, such overlapping is completely unavailable as a dust guard for opening 21' when insert diaphragms are not used.

The square opening diaphragm of this embodiment has a set of four leaves 1 (FIGURE 9) for forming square opening D (FIGURE 14), the four sides of opening D of portion E of each leaf. Each leaf is driven, through dowel pin 1' rigidly fitted to the leaf and slidable in dowel pin aperture 14', by dowel ring 14 (FIGURE 11) as the latter is rotated, dowel pin 1' making a circular movement of radius $R_2$ (FIGURE 11) around the optical axis as a center. The circular movement each leaf makes around its cooperating dowel pin aperture as a center, has a radius $R_1$ (FIGURE 12) equal to radius $R_2$ of the circular path of dowel pin 1' about dowel pin aperture 14', and is under the control of another dowel pin 1", rigidly mounted in the leaf, which moves along arcuate guide slot 22' of slot ring 15, the center of curvature of each slot 22' lying on a circle of radius $r_1$ with the optical axis as center. On the other hand, axial distance $r_2$ (FIGURE 9) between dowel pins 1' and 1", rigidly mounted on the diaphragm leaf, is equal to the distance $r_1$ (FIGURE 12) between the centers of curvature 0' of arcuate slots 22' and optical axis 0. Therefore, the rotation of square diaphragm ring 5, with orientation ring 16 being clamped, produces parallel movements of diaphragm leaves 1 of which, consequently, one side 1''' (FIGURE 9) changes the distance from the optical axis but does not change its orientation, that is, produces changes only in the area of the square opening defined by the diaphragm.

If distance $b$ (FIGURE 9) between side 1''' of diaphragm leaf 1 and dowel pin 1' is made greater than that between such side 1''' and optical axis 0, at least within such limits as may be practical for the use of square opening diaphragms, the ratio of the shift of the sides of the square opening of the diaphragm to the unit angular displacement of the square diaphragm ring 5 decreases in magnitude in accordance with the sine function as the angular displacement of square diaphragm ring 5 becomes greater than it has when the diaphragm opening has the largest area, that is, as the diaphragm opening gets smaller. Therefore, it may be feasible to furnish the diaphragm scale with equal, or at least broad, graduations of practical allowable accuracy for the necessary range in practice, for example, in the range of from 1:32 to 1:90, and this feature is a particular advantage of the present inventive system.

In the diaphragm leaf 1 of FIGURE 9, if the foot of the perpendicular from dowel pin 1' to side 1''' thereof falls on, or in the vicinity of portion E of such side, which is utilized as a side of the opening defined by the diaphragm, various possible adverse effects from manufacturing errors upon accurate orientation of the sides of the diaphragm opening are diminished. In this respect also, the structural design according to the invention is advantageous as to accuracy of manufacture.

In this second illustrative embodiment, the iris diaphragm system 7 (FIGURE 6) is independent in action of the square opening diaphragm system. Unnecessary open spaces C (FIGURE 14) left uncovered by square opening diaphragm leaves 1, resulting from restricting the leaves in size in order simply to determine the contour of the square opening, with a view to minimizing to the greatest possible extent the diameter of the lens mount, are covered by utilizing a set of auxiliary leaves 13 (FIGURE 13). The four auxiliary leaves 13 do not participate in determining the contour of the square diaphragm opening but merely act at all times to cover the above mentioned unnecessary open spaces C, each of auxiliary leaves 13 being suitably shaped for the purpose and provided with dowel pins 13' and 13" so as to be engaged, respectively, with a dowel pin aperture 14″ in dowel ring 14 and with an associated slot 22″ in slot ring 15. Auxiliary leaves 13 overlap square opening diaphragm leaves 1 and are positioned between slot ring 15 and dowel ring 14.

The above described second illustrative embodiment has square opening forming diaphragms. Theoretically, however, the opening so defined may take the form of any regular polygonal figure, such as rectangular, equilateral pentagon, hexagon, etc., with interior angles of less than 180 degrees, viz., with diaphragm openings always similar in contour so long as the adjacent sides of the opening formed thereby are similar in contour and their ratios in length, and the value of $R_1=R_2$ is equal to the distance to optical axis O. In such second illustrative embodiment, it is feasible to provide equally, or at least broadly, graduated diaphragm scales of practical allowable accuracy, and in the range useful in practice, in lens mounts of relatively small diameter; such second embodiment thus offers advantages both in respect of manufacturing and of accurate operation. The incorporation of auxiliary diaphragm leaves for covering unnecessary open spaces C is easy and there is no necessity compelling the use of a mechanism specifically for covering such open spaces interlocked with the iris diaphragm.

What I claim is:

1. A square aperture forming diaphragm for incorporation in a lens mount, comprising four diaphram leaves, each leaf having its radially inner face in the form of a right angle open facing the optical axis of the lens mount, at least one leg of the angle having a linear portion extending a substantial length from the vertex of the angle, a pair of interconnectable rings coaxially within the lens mount barrel, the diaphragm leaves being positioned in the interspace between the pair of rings, grooves in one of the rings for slidably guiding the leaves, the ring having the grooves being affixed to the lens mount barrel, pins projecting laterally from the leaves, slot means in the other ring of the pair for maintaining the laterally projecting pins symmetrically positioned about optical axis of the lens mount, driving means for rotating the lens mount barrel, and means for selectively rotating both diaphragm rings and either ring with the lens mount so that on rotation of both rings both the orientation of the sides of the square aperture formed by the leaf legs having the linear portions of substantial length and the area of the so formed square aperture are changed, on rotation of the ring slidably guiding the leaves the area of the so formed square aperture only is changed, and on rotation of the ring with the pin-holding slot means the orientation only of the sides of the so formed square aperture is changed.

2. A square central aperture forming diaphragm for incorporation in a lens mount including a barrel and means for rotating the barrel, comprising a pair of diaphragm rings of which one is affixed to the barrel, four diaphragm leaves of which each leaf has a radially inner face toward the lens mount axis defining a right angle open toward the axis, two spaced pivot pins projecting from opposite lateral faces of each leaf, four arcuate grooves for predetermined length in the ring affixed to the barrel, each groove for guiding one laterally projecting pin of the associated leaf of the four leaves, the other diaphragm ring having four spaced apertures into which the second laterally projecting pin of the associated leaf fit, each aperture being fitted with one second laterally projecting pin, the radius of curvature of each arcuate groove being equal to the distance between the aperture in the apertured ring and the optical axis of the lens barrel so that on aperture control the configurations of the so formed square central apertures are similar without change in the orientation of the sides of the aperture.

3. A built-in square central aperture forming diaphragm according to claim 2 in which the inner face radially of each leaf has at least one leg of its right angle extending a substantial linear length from the vertex of the angle, the pivot pin of each leaf fitted in an aperture of the apertured ring extending laterally from the end region of the other leg of the right angle remote from the angle vertex, and the distance, when the square aperture is fully opened, between the leg of substantial linear length of each leaf and the lens barrel axis is smaller than the distance between said pivot pin and said leg of substantial linear length.

4. A built-in square central aperture forming diaphragm according to claim 3 in which the outer peripheral face of each diaphragm leaf is substantially arcuate, four annular segments, each segment having a pair of pins respectively extending from laterally opposite faces thereof from diagonally opposite corner regions thereof, four linear grooves in the diaphragm ring having the arcuate grooves, each linear groove receiving a first pin of the pair extending from each segment and positioned interlaced between two arcuate grooves, a second set of four apertures in the other diaphragm ring, each second set aperture being between two of the four apertures into which pins of the diaphragm leaves are fitted, the second pin of the pair extending laterally from each segment fitted into an individual aperture of the second set, the dimensions of the segments and of the linear grooves being such that on aperture control by rotation of the ring having the arcuate and linear grooves the segments cover the portions within the lens barrel but external to the formed square left uncovered by the outer peripheral regions of the square aperture forming diaphragm leaves.

References Cited by the Examiner

UNITED STATES PATENTS

| 1,368,608 | 2/1921 | Curron | 95—64 |
| 2,949,076 | 8/1960 | Finkl | 95—64 |
| 3,040,644 | 6/1962 | Hearther | 95—64 |

OTHER REFERENCES

Mertle: The American Photo-Engraver, vol. 21, No. 10, 1929, pages 937–951.

NORTON ANSHER, *Primary Examiner.*